Aug. 1, 1950 — D. W. BLEVANS — 2,516,947
VALVE SEAT
Filed May 15, 1947 — 2 Sheets-Sheet 1
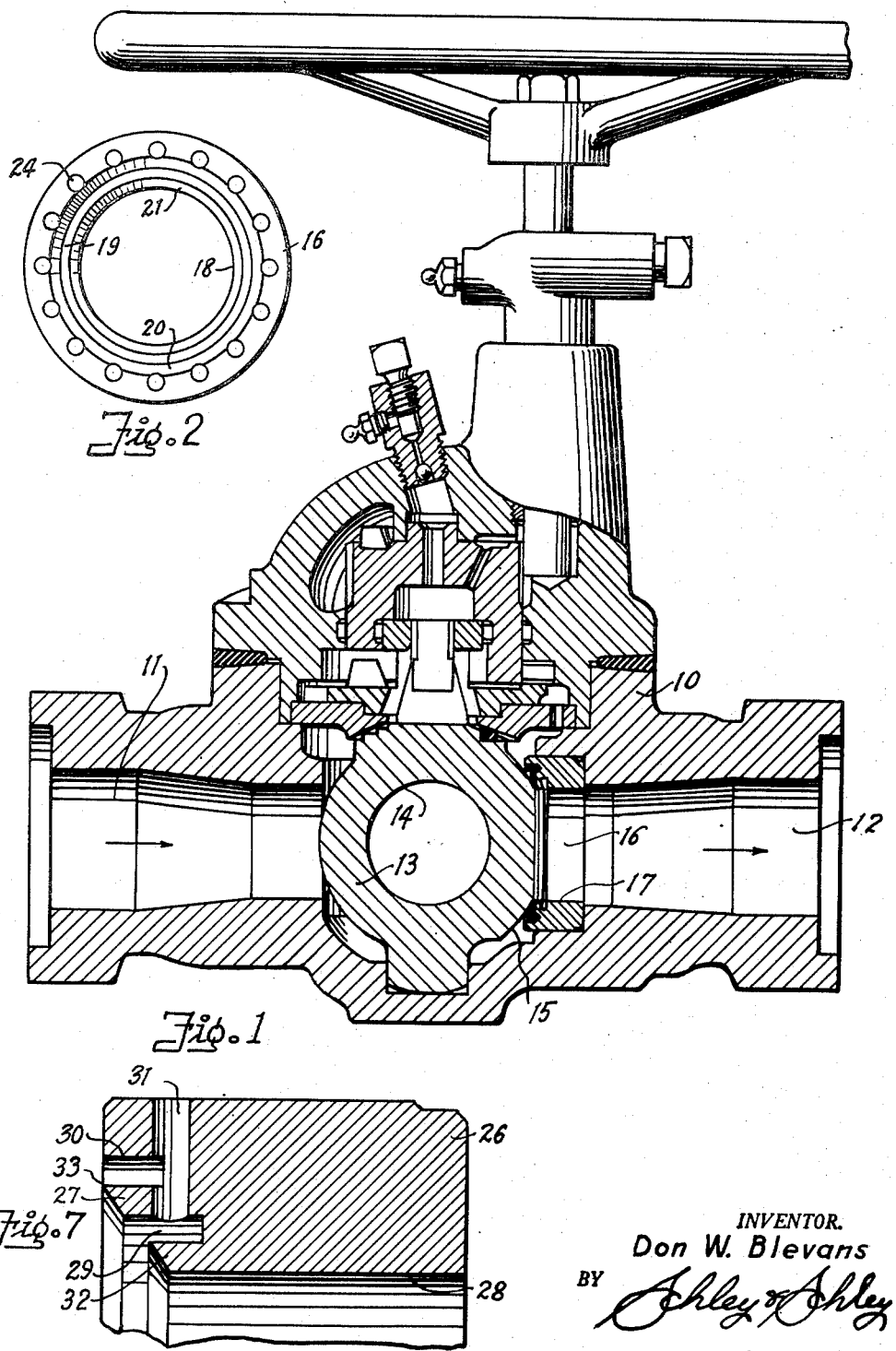
INVENTOR.
Don W. Blevans
BY Ashley & Ashley
ATTORNYS INVENTOR.
Don W. Blevans
BY Ashley & Ashley
ATTORNEYS Patented Aug. 1, 1950

2,516,947

UNITED STATES PATENT OFFICE 2,516,947

VALVE SEAT

Don W. Blevans, Tulsa, Okla., assignor to Orbit Valve Company, Tulsa, Okla., a corporation of Oklahoma Application May 15, 1947, Serial No. 748,157

14 Claims. (Cl. 251—113)

This invention relates to new and useful improvements in valve seats.

The invention has particularly to do with high fluid pressure valve cores and seats therefor and involves an improved seat which has certain novel features.

It has been a common practice to construct valve seats with a contact surface formed wholly, or in part, of a flexible or elastic material capable of receiving particles of sand, scale, or other solids, which may be carried in the fluid stream, and still make sealing contact with the opposing valve face or core. However, such valves operate satisfactorily at low pressures only. The modern necessity for handling high fluid pressures, such as 5,000 to 15,000 pounds per square inch, presents difficulties that are not encountered in low or moderate pressure practice. Fluids and semi-solids such as rubber and other elastic materials will be forced through inconceivably small openings; elastic gaskets will be forced out from between bolted flanges and valve seat inserts will adhere to and follow a valve core, pulling out of the retaining ring without breaking the sealing contact between the core and the insert.

It is therefore, a particular object of this invention to provide an improved valve seat adapted for use in a high pressure valve which makes provision for a snug, efficient closing of the valve with proper seating of the core to prevent leakage between the latter and the valve seat; and wherein provision is made for substantially eliminating the difficulties previously arising from the presence of foreign matter trapped between the seat and the core so as to prevent uniform engagement of the latter two elements.

An important object of the invention is to provide an improved seat for a high pressure valve wherein one or more relatively thin annuli are presented as a seating surface for the core of the valve, the annulus being of such nature and having such relation to the core as to flex or strain under the load exerted by fluid pressure upon the core and thereby upon said seat, whereby the annulus is deflected into a substantially uniform peripheral contact or seating engagement with the core.

Yet another object of the invention is to provide an improved valve seat of the character described in which the annulus or annuli are positioned at a relatively acute angle with respect to the seating surface of the valve core whereby the deflecting action exerted by the core by reason of the fluid pressure acting thereon, is enhanced, and more efficient and positive seating of the core results.

A principal object of the invention resides in the provision of a deformable or elastic material between and/or adjacent the annulus or annuli so as to prevent the accumulation of foreign matter around or between the latter, said material being so arranged as to engage the seating face of the core when the valve is closed and to yield under such closing.

A particular object of the invention is to provide an improved valve seat of the character described having one or more annular grooves defining an annulus or annuli and wherein a deformable or elastic material is bonded to the metal of the seat in at least one groove, it being important that the total bonded area of the elastic material in relation to the face area exposed to the valve core be such that when the core is moved away from the valve seat the packing will not be drawn or urged from the groove; thus the width and/or depth of the groove becomes controlling.

A further object of the invention is to provide an improved seat for a high pressure valve core, which seat is provided with at least one annular groove and an additional groove or openings, in which a deformable elastic material is secured so that one exposed face of said material will be constantly exposed to the high pressure fluid acting against the valve core on the upstream side, while the other exposed face of the material will be engaged by the valve core when said valve core is seated, together with one or more relatively thin annuli contiguous to the deformable material, whereby the material will be deformed into sealing engagement with the valve core due to such high fluid pressure, and the contacting faces of the annuli will be deflected or distorted into sealing contact with said core due to the high fluid pressure acting on said core, to the end that a highly efficient seat will be obtained and a continuous intimate annular contact will be had and leaking prevented.

A construction designed to carry out the invention will be hereinafter described together with other features of the invention.

The invention will be more readily understood from a reading of the following specification and by reference to the accompanying drawings, wherein examples of the invention are shown, and wherein:

Fig. 1 is a view, partly in elevation and partly in section, of a valve having a seat constructed in accordance with the invention positioned therein.

Fig. 2 is a face view of the seat as shown in Fig. 1,

Figure 3:
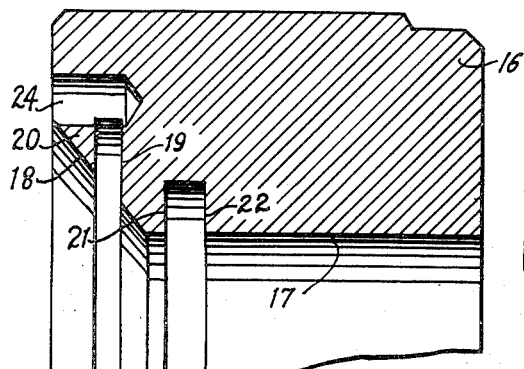
Figure 8:
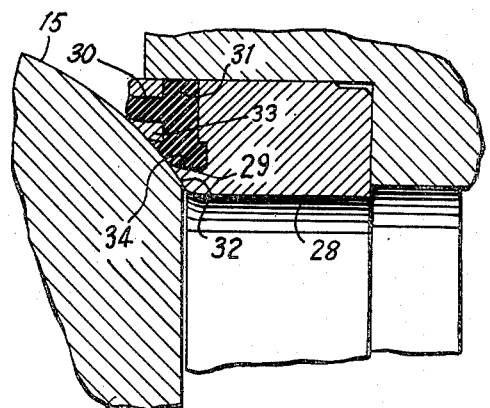
Figure 4:
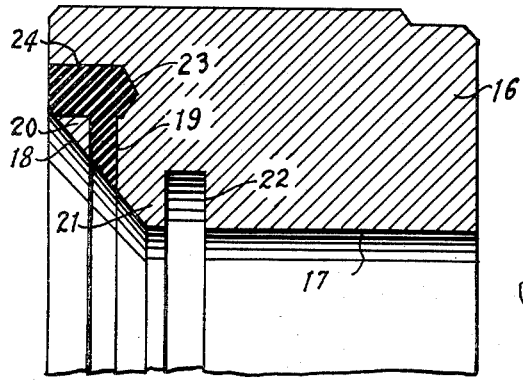
Figure 6:
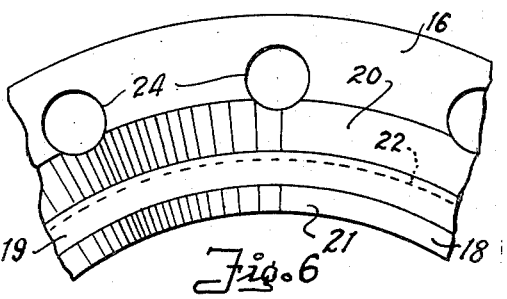
Figure 5:
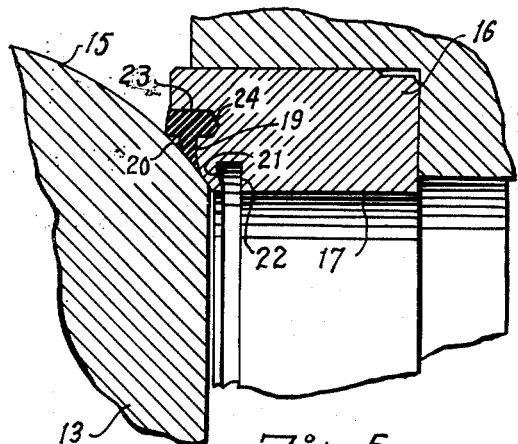
Figure 9:
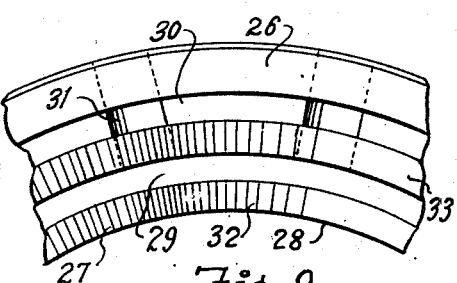

Fig. 3 is an enlarged, fragmentary, transverse sectional view of the seat, the deformable material being omitted, Fig. 4 is a view similar to Fig. 3, the deformable material being in place, Fig. 5 is a partial, transverse, sectional view of the seat shown in Fig. 1, enlarged and illustrating in exaggerated form the deformation and deflection which occurs when the core seats under a high fluid pressure, Fig. 6 is an enlarged, fragmentary and elevation or face view of the seat, Fig. 7 is a view similar to Fig. 3, and showing another form of the invention, the deformable material being omitted, Fig. 8 is a view similar to Fig. 5, but showing the second form of the invention, and Fig. 9 is an enlarged, fragmentary, face view similar to Fig. 6, and showing the second form of the invention as illustrated in Fig. 7.

In the drawings, the numeral 10 designates the body or housing of a high pressure cut-off valve. The valve illustrated is of the spherical or convex core type in which the core rotates as well as moves axially into engagement with its seat. However, the invention is not limited to such a core and its complementary seat, but may be applied to any valve in which the face and seat engage axially. Since only the core and the seat are involved, the other valve elements will not be described as such elements may be of any suitable or desirable construction.

In the type of valve illustrated, the body 10 has an inlet passage 11 and outlet passage 12 with core 13 interposed therebetween. The core has a general spherical shape and has a flow passage 14 extending therethrough. A convex annular seat face 15 is provided on one exterior wall of the core 13, the axis of said face being disposed at right angles to the axis of the bore 14. The face 15 is adapted to engage a valve seat ring 16 carried by the body 10 and having an axial bore or flow passage 17. The ring is substantially rectangular in cross-section and has an inwardly beveled, annular seat face 18 formed on its exposed side for engaging by the face 15 of the core 13.

This invention is not concerned with the problems which ensue when the valve is open in a flowing position, but is directed primarily to an effective closing of the valve and preventing of leakage between the core and the seat at pressures of the magnitude of 15,000 pounds per square inch. Since these high pressures may be utilized with benefit to enhance the seating action obtained in a valve, it becomes apparent that the cause of the problems encountered in a high pressure valve may also be their cure.

Heretofore, attempts to cure leaking in high pressure valve have been made by using various types of packing rings in the contracting faces of the valves, but such packings are subject to by-passing of the high pressure fluid. These packings are known as "inserts" and one difficulty has been the tendency of the packing to follow the seat face of the core when the core is unseated to open the valve.

To overcome the various problems arising, I have developed a valve seat which utilizes the pressure of the fluid being controlled by the valve to provide a fluid-tight seal. The seat is preferably, although not necessarily, in the form of the valve seat ring 16 which is formed separately from the body 10 thus allowing the use of various alloys, heat treatment, and the like. Such a structure is entirely customary.

As shown in Figs. 1 through 5, the preferred form of the valve seat contemplated by this invention, has an annular groove 19 positioned medially and concentrically of the seat face 18 and extending radially of the ring 16 a sufficient depth or distance as to define two annuli 20 and 21 on the upstream and downstream sides, respectively, of said groove. The width of the groove, in proportion to the dimensions of the ring and the seat face, is such as to give the annulus 20 a relatively thin cross-section, whereby the latter possesses a degree of flexibility in a transverse direction and is capable of deflecting or distorting in an elastic manner upon engagement by the seat face 15 of the core 13.

To impart the same property of flexibility to the annulus 21, a circumferential groove 22 is cut in the bore 17 sufficiently close to the downstream wall of the groove 19 to give the latter annulus a relatively thin cross-section. The depth of both of the grooves 19 and 22 is adequate to impart the desired degree of yieldability to the annuli to permit them to undergo a limited deflection, as is indicated in an exaggerated fashion in Fig. 5.

The preferred line of tangency between the convex seat face 15 of the core 13, and the seat face 18 of the ring seat 16 as the core moves into engagement with the seat, is within the confines of the groove 19, so that upon continued closing of the valve the core contacts both of the annuli 20 and 21. Upon complete closing and under the effect of the pressure exerted by the pressure fluid on the upstream side of the core, the annuli may deform or flex to some extent so as to conform to any eccentricity or any irregularities which may exist in the seat face 15 carried by said core. Thus, each annulus functions as an individual, flexible seat which selectively deflects in engaging the core seat face to conform to the contour of the latter face and provide a continuous peripheral seal. This ability to conform to the outline of the core is, of course, largely due to the relatively thin and long cross-sectional shape of the annuli, but a considerable portion of this desirable function is also contributed by the directing of the annuli at an acute angle with respect to the engaging face 15 of the core, so that the major portion of the gross force exerted by the pressure fluid is reflected in the force which tends to strain or deflect the annuli in a transverse, as contrasted to a circumferential or radial direction. It is pointed out, in addition to the fact that a less than major portion of the gross force is directed radially of the annuli so as to strain them circumferentially, that the elasticity of the annuli in a transverse direction is greater than in a circumferential direction. Therefore, sufficient deflection of the annuli is more readily obtained in a transverse direction with less danger of exceeding the elastic limit of the material involved, and the angular positioning of the annuli with respect to the seat face of the core, becomes of considerable importance.

To prevent the accumulation of foreign matter such as pipe scale, sand, and the like, within the groove 19, and the consequent impairing of the seating action of the core 13, a suitable deformable elastic material or packing 23 is bonded within said groove. Particles of foreign matter, which accumulate within the groove so as to lie between the seat and the core as the latter two elements engage, will usually vary as to size and hardness so that an excessively uneven seating surface would be likely to result. Naturally, such an occurrence would cause the pressure exerted by the closing valve core to be localized at some high point, and excessive and permanent distortion of the annuli 20 and 21 as well as the seat ring 16 would be a probable result. In addition, foreign matter may be trapped between the core and the seat in the initial stage of closing. If the groove 19 is already filled with debris, such trapped material is also quite likely to cause damage to the seat.

The provision of the deformable material 23 solves both of these problems as well as having other beneficial results. Since the material substantially fills the groove 19, no recess or pocket is left in which foreign matter may lodge. Also, the deformable nature of said material allows the foreign particles to press thereinto as the valve is closed so that obstruction of a proper seating is minimized, while the elastic nature of the material causes it to return to a full groove-protecting position upon the opening of the valve.

The material or packing 23 may be of any suitable composition so long as the necessary properties are had. Synthetic rubbers, such as the butadiene or chloroprene rubbers, or other suitable plastic materials may be used. The hardness or plasticity of the material must be controlled so as to give the desired properties of elasticity and yieldability while maintaining the necessary degrees of strength and immobility. The operating pressure range of the valve in question determines to a large extent the degree of hardness required. For instance, some valves will utilize a modified butadiene rubber having a durometer hardness reading of 35–40, A scale, while other valves may best employ a rubber having a hardness of 70–80, on the same scale. The hardness may be varied within reasonable and obvious limits.

The terms "material" and "packing" have been used synonymously herein to designate the packing material disposed within the groove or grooves of the seat ring. Either term is to be construed as encompassing the other and to include the various alternative substances recited, when the latter are used as herein set forth.

In yielding under the ingress of foreign material as well as under the deflection of the annuli 20 and 21, the material 23 must have a means for escaping from too close a confinement. Therefore, a plurality of spaced ports 24 are bored into the seat ring 16 outwardly of the annulus 20 and parallel to the axis of the bore 17. The ports open on the exposed side of the ring and intersect the bottom of the groove 19 so as to establish communication between said groove and the interior of the housing 10. To prevent clogging of the ports, the entire space defined by the ports and the groove is filled with the deformable material 23, formed or molded into an integral homogeneous mass. Thus, expansion or deformation may be had by reason of the ports while pressures exerted upon the ports are reflected at the core engaging face of said material.

To prevent the deformable material from following the core as the valve is opened, the material is bonded to the walls of the groove 19, and, if desired, to the walls of the ports 24. Such bonding also prevents any other bodily movement of the material which would tend to occur.

It is important that the total force exerted upon the area of the material exposed to the core be balanced or exceeded by the bond strength as represented by the area of such bond. Thus, the depth and width of the groove 19 must be partially determined by the size and operating pressure of the valve insofar as said depth and width define the forces to be controlled.

It will be noted in Fig. 4 of the drawings that the groove 19 is completely enclosed or blocked by the engagement of the core 13 with the annuli 20 and 21 when the valve is closed. At the same time, the ports 24 are exposed to the upstream pressure as exerted within the housing 10. Manifestly, the deformable material 23 will be urged against the face 15 of the core under a pressure equal to that at the ports, and a valuable supplementary sealing action will obtain.

In Figs. 7 through 9 of the drawings, an alternate form of the valve seat is shown. This second form possesses all the features and advantages of the first form described and represents a modification thereof.

The second form utilizes a seat ring 26 similar to the ring 16, and having an inwardly beveled, annular seat face 27 surrounding one end of an axial bore 28. A pair of spaced, annular, concentric grooves are cut in the exposed side of the ring 26 parallel to the axis of the bore 28. The inner groove 29 is positioned medially of the seat face 27, while the outer groove 30 lies contiguous to the outer edge of said seat face. A plurality of radial ports 31 extend from the outer periphery of the ring 26 to the inner groove 29, the outer groove 30 being of such depth as to intersect the ports whereby the two grooves are placed in communication. When the ring is positioned within the housing 10, the outer ends of the ports 31 are blocked by the body of said housing.

An inner annulus 32 is defined by the bore 28 and the groove 29, and a similar outer annulus 33 is formed between the two grooves. As clearly appears in Fig. 7, the annuli have a relatively long, thin cross-sectional shape, and their outer ends form the seating surfaces for the valve core 13. Upon closing of the valve, the annuli may undergo radial deflection in much the same fashion as the annuli 20 and 21 undergo transverse deflection, so as to conform to the outline of the seat face 15 and provide an efficient seal. An elastic deformable packing material 34, comprised of synthetic rubber or other suitable substance, fills both grooves and also the ports. The packing 34 is bonded to the walls of the inner groove 29, and may be bonded, if desired to the walls of the outer groove and the ports.

This modified form of seat functions in substantially the same manner as the first form described, the grooves lending flexibility to the annuli, and the outer groove serving the additional purposes of allowing deformation of the packing 34 during closing of the valve and permitting the exertion of pressure on the packing after such closing.

It is pointed out, that in both forms the walls of at least one of the grooves aid in retaining the packing in place. Since the packing tends to flow transversely of the groove in each instance, the side walls of the groove function as a physical barrier to impede extrusion of the packing.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A valve seat for a high pressure valve having a core including, a seat having a seating face and an annular groove in the face dividing said face into two annuli having deflectable face portions, said seat having a coaxial annular groove having at least a portion without the face, said deflectable face portions being adapted to be deflected by the core when the latter engages said seat face, said seat having an opening outwardly of its face and connected with the first groove, and a continuous deformable packing secured in the groove having one face exposed at the groove and another face exposed at the opening.

2. A valve seat for a high pressure valve having a core including, a seat having a seating face and an annular groove in the face defining an annulus having a deflectable face portion, said seat having a coaxial annular groove having at least a portion without the face, said deflectable face portion being adapted to be deflected by the core when the latter engages said seat face, and a deformable packing material disposed within the first groove and bonded to the side walls thereof.

3. A valve seat for a high pressure valve having a core including, a seat having a seating face and an annular groove in the face defining an annulus having a deflectable face portion, said seat having a coaxial annular groove having at least a portion without the face, said deflectable face portion being adapted to be deflected by the core when the latter engages said seat face, said seat having an opening outwardly of its face connected with the fruit groove, and a continuous deformable packing material secured in the groove and having one face exposed for engagement by the valve core.

4. A valve seat for a high pressure valve having a core including, a seat having a seating face and an annular groove in the face defining an annulus having a deflectable face portion, said seat carrying a second annular groove disposed concentrically with respect to the first groove without the face and defining a second annulus having a deflectable face portion, said deflectable face portions being adapted to be deflected by the core when the latter engages said seat face, and a continuous deformable packing material secured in at least one of said grooves for preventing the accumulation of foreign matter therein.

5. A valve seat for a high pressure valve having a core including, a seat ring having a beveled seating face and an annular face groove in the face dividing the latter into two annuli having deflectable face portions, said ring having a second groove positioned concentrically with respect to the first groove without the face for lending flexibility to one of said annuli, said ring having an opening outwardly of its face connected with the face groove, and a continuous elastic packing material secured in the face groove and the opening by bonding to the side walls of the groove.

6. A valve seat for a valve having a core including, a seat ring having a beveled seating face and an annular face groove in the face and disposed at an angle with respect thereto so as to define an annulus having a deflectable face portion, said ring having a second groove positioned concentrically with respect to the first groove without the face and defining a second annulus having a deflectable face portion, said ring having an opening outwardly of its seating face connected with the face groove, and a continuous elastic packing material secured in the face groove and opening and having one face adapted to be engaged by the valve core when the core engages the seat face.

7. A valve seat for a high pressure valve having a core including, a seat ring having a beveled face, said ring having an annular groove in the face and a concentric annular groove without the face, said grooves extending at an acute angle with respect to the seating face and defining a pair of annuli which extend at an acute angle with respect to the seat face, the peripheries of the annuli forming at least a portion of the seat face whereby a valve core engaging said face tends to deflect said annuli, said ring having an opening outwardly of its seating face and connected with at least one of said grooves, and a continuous elastic packing material disposed in the latter groove and opening and bonded to the side walls of the groove.

8. A valve seat for a high pressure valve having a core including, a seat having a seating face and an annular groove in said face dividing the face into two annuli having deflectable portions, said seat having a coaxial annular groove having at least a portion without the face, and a continuous packing embedded in the seat having a portion exposed adjacent and outwardly of the seating face and a portion exposed at the first groove, whereby the annuli are deflected when the core is engaged with the seating face and the packing is deformed under fluid pressure into sealing engagement with said core.

9. A valve seat for a high pressure valve having a core including, a seat having a seating face and an annular groove in said face dividing the face into two annuli having deflectable face portions, said seat having a coaxial annular groove without the face, the seat having ports beyond the seating face connected with the face groove, and an elastic packing secured in the face groove and the ports and constantly exposed to fluid pressure at said ports and having a ring face exposed at the face groove.

10. A valve seat for a high pressure valve having a spherical or convex core including, a seat having a seating face and an annular groove in said seat dividing the face into two annuli having deflectable face portions, the seat having ports beyond the sealing face connected with the groove, the seat having a bore and an annular groove in the bore contiguous to the inner annulus for increasing the resiliency of said annular groove and an elastic packing secured in the face groove and the ports and constantly exposed to fluid pressure at said ports and having a ring face exposed at the groove.

11. A valve seat for a high pressure valve having a spherical or convex core including, a seat having a seating face and an annular groove in the face dividing said face into two annuli having deflectable face portions, said seat having a coaxial annular groove without the face, said deflectable face portions being distorted by the core when the latter engages said seat face, said seat having an opening outwardly of its face located to be constantly exposed to an upstream pressure fluid in the valve and connected with the face groove, and a continuous elastic packing secured in the face groove and opening having one face exposed at the opening to be deformed into sealing position when the core engages the seat face.

12. A valve seat for a high pressure core including, a seat having a seating face and an annular groove in said face dividing the face into two annuli having deflectable face portions, said seat having a coaxial annular groove without the face, said seat having an opening outwardly of its face located to be constantly exposed to an upstream fluid pressure in the valve connected with the face groove and a continuous elastic packing in the face groove and opening exposed to the upstream pressure and exposing a face in the seat to the core, said packing being bonded in at least the face groove, the face groove having a total bonding area proportioned to the area of the packing acted upon by the force of the pressure fluid and to the area of the packing exposed at the seat face to prevent the core from drawing the packing from the groove when moved away from the seat face.

13. A valve seat for a high pressure valve having a core including, a seat having a seating face and an annular groove in said face extending radially thereof dividing the face into two annuli having deflectable portions, and a continuous packing embedded in the seat having a portion exposed adjacent and outwardly of the seating face and a portion exposed at the groove whereby the annuli are deflected when the core is engaged with the seating face and the packing is deformed under fluid pressure into sealing arrangement with said core.

14. A valve seat for a high pressure valve having a core including, a seat having a seating face and an annular groove in the face defining an annulus having a deflectable face portion, the groove extending substantially radially of the seat, said deflectable face portion being adapted to be deflected by the core when the latter engages said seat face, a deformable packing material disposed within the groove and having one face exposed for engagement by the valve core, the seat having an opening outwardly of its face connected with the groove, and the deformable packing material having a face exposed at said opening.

DON W. BLEVANS.

REFERENCES CITED

The following references are of record in the file of this patent:

UNITED STATES PATENTS

| Number | Name | Date |
| --- | --- | --- |
| 1,679,779 | Oberhuber | Aug. 7, 1928 |
| 1,971,713 | Greve | Aug. 28, 1934 |
| 2,060,748 | Roberts | Nov. 10, 1936 |
| 2,485,092 | Gannon | Oct. 18, 1949 |

FOREIGN PATENTS

| Number | Country | Date |
| --- | --- | --- |
| 93 | Italy | of 1889 |